(12) United States Patent
Wacinski

(10) Patent No.: US 12,390,959 B1
(45) Date of Patent: Aug. 19, 2025

(54) SYSTEMS AND METHODS FOR THE MANUFACTURE OF AGGLOMERATED RECYCLED PLASTIC FOR USE WITH BITUMINOUS COMPOUNDS

(71) Applicant: ECOLOGIC MATERIALS LLC, Sheridan, WY (US)

(72) Inventor: Christopher Wacinski, Lakewood, CO (US)

(*) Notice: Subject to any disclaimer, the term of this patent is extended or adjusted under 35 U.S.C. 154(b) by 531 days.

(21) Appl. No.: 17/895,333

(22) Filed: Aug. 25, 2022

Related U.S. Application Data

(60) Provisional application No. 63/393,345, filed on Jul. 29, 2022, provisional application No. 63/283,025, filed on Nov. 24, 2021.

(51) Int. Cl.
*B02C 18/00* (2006.01)
*B29B 17/04* (2006.01)
*C09J 195/00* (2006.01)
*B29K 105/26* (2006.01)

(52) U.S. Cl.
CPC .......... *B29B 17/0412* (2013.01); *C09J 195/00* (2013.01); *B02C 18/00* (2013.01); *B29B 2017/042* (2013.01); *B29B 2017/0476* (2013.01); *B29K 2105/26* (2013.01)

(58) Field of Classification Search
CPC ............ B29B 17/0412; B29B 17/0476; B29B 17/042; B02C 18/00; C09J 195/00; B29K 2105/26

USPC ........................................................ 524/60
See application file for complete search history.

(56) References Cited

U.S. PATENT DOCUMENTS 6,000,877 A * 12/1999 Fishback ................. C08L 95/00
106/284.01

FOREIGN PATENT DOCUMENTS

WO    WO2020160423 A1    8/2020
WO    WO-2020223534 A1 * 11/2020 ......... B29B 17/0412

* cited by examiner

*Primary Examiner* — Ruiyun Zhang
(74) *Attorney, Agent, or Firm* — Kutak Rock LLP; Jason S. Jackson

(57) ABSTRACT

Methods and systems for producing an agglomerated recycled plastic for use in asphalt products is provided. The method of various embodiments can comprise loading a quantity of recycled plastic into a chamber with a cutting apparatus configured to produce agglomerated plastic particles, running the cutting apparatus for a first interval to produce an intermediate agglomerate, maintaining a chamber air temperature during the first interval, adding a first amount of water to the chamber after the first interval, running the cutting apparatus for a second interval with the intermediate agglomerate to produce a plurality of agglomerated plastic particles adapted for use in asphalt production, and discharging the plurality of agglomerated plastic particles from the chamber after the second interval.

19 Claims, 3 Drawing Sheets

100

---

Load a quantity of recycled plastic into a chamber with a cutting apparatus configured to produce agglomerated plastic particles
102

↓

Run the cutting apparatus for a first interval to produce an intermediate agglomerate
104

↓

Maintain a chamber air temperature during the first interval
106

↓

Add a first amount of water to the chamber after the first interval
108

↓

Run the cutting apparatus for a second interval with the intermediate agglomerate to produce a plurality of agglomerated plastic particles adapted for use in asphalt production
110

Load a quantity of recycled plastic into a chamber with a cutting apparatus configured to produce agglomerated plastic particles
202

↓

Run the cutting apparatus for a first interval comprising one to ten minutes to produce an intermediate agglomerate
204

↓

Maintain a chamber air temperature of less than 100 degrees Celsius during the first interval
206

↓

Add a first amount of water comprising 25 to 2000ml to the chamber after the first interval
208

↓

Run the cutting apparatus for a second interval comprising one to 120 seconds with the intermediate agglomerate to produce a plurality of agglomerated plastic particles adapted for use in asphalt production, wherein the plurality of agglomerated plastic particles comprise flakes with an average diameter from .1 mm to 30 mm
210

↓

Discharge the plurality of agglomerated plastic particles from the chamber after the second time interval
212

Fig. 2

SYSTEMS AND METHODS FOR THE MANUFACTURE OF AGGLOMERATED RECYCLED PLASTIC FOR USE WITH BITUMINOUS COMPOUNDS

CROSS-REFERENCE TO RELATED APPLICATIONS

This application claims priority pursuant to 35 U.S.C. § 119(e) to U.S. Provisional Patent Application Ser. No. 63/283,025, filed Nov. 24, 2021, and U.S. Provisional Patent Application Ser. No. 63/393,345, filed Jul. 29, 2022, the entire disclosures of which are incorporated herein by reference.

FIELD OF THE INVENTION

The present invention relates generally to processing recycled plastics. More specifically, various embodiments of the present invention are concerned with processing recycled plastics that can be introduced in various stages of bituminous-based asphalt manufacturing, namely polymer modification of asphalt ("PMA") production, hot mix asphalt ("HMA") production, warm mix asphalt ("WMA") production, mastic asphalt production, roofing tiles, and various emulsions.

BACKGROUND OF THE INVENTION

Asphalt cement makes up nearly 95% of all pavement material used on roads and parking lots. The pavement is a mixture of asphalt cement and aggregate, typically stone and sand. Generally, asphalt cement is made from crude oil and is a non-renewable resource. Because of this, asphalt cement is subject to price fluctuations to the volatility of the oil markets. Moreover, asphalt cement is a relatively brittle material, leading to the material cracking and crumbling if not properly maintained. Accordingly, it would be advantageous to provide for alternative sources of material for roadways and/or alternative method of manufacturing roadway materials to reduce reliance on crude oil and improve the overall performance of asphalt-based roadways.

Plastic waste is becoming increasingly problematic. Approximately 300 million tons of plastic are produced worldwide each year, with only about 9% of that plastic being recycled. The vast majority of plastic waste is sent to landfills, with only about 14% of the waste being incinerated. As a result, approximately 80% of the plastic that has ever been produced still exists today. Given the substantial amount of waste plastic available and the aforementioned issues with asphalt roadways, it would be advantageous to provide for a system and method which utilized and/or repurposed waste plastic in roadways, thereby reducing the amount of crude oil needed for asphalt-based roadways.

SUMMARY OF THE INVENTION

The present invention comprises systems and methods for the manufacture of agglomerated recycled plastic configured for use with bituminous compounds. In some embodiments, the systems and methods herein utilize steps and/or techniques which aide in the various stages of bituminous-based asphalt manufacturing, namely polymer modification of asphalt ("PMA") production, hot mix asphalt ("HMA") production, warm mix asphalt ("WMA") production, mastic asphalt production, roofing shingle production, and various emulsions.

Various embodiments of the present invention provide methods for producing an agglomerated recycled plastic for use in asphalt products, the methods comprising variations of: (1) loading a quantity of recycled plastic into a chamber with a cutting apparatus configured to produce agglomerated plastic particles; (2) running the cutting apparatus for a first interval to produce an intermediate agglomerate; (3) maintaining a chamber air temperature before, during, and/or after the first interval; (4) adding a first amount of water to the chamber before, during, and/or after the first interval and then running the cutting apparatus for a second interval; (5) running the cutting apparatus for a second interval with the intermediate agglomerate to produce a plurality of agglomerated plastic particles adapted for use in asphalt production; (6) discharging the plurality agglomerated recycled plastic particles from the chamber after the second time interval; (6) mixing the agglomerated recycled plastic with an asphalt compatibilizer; and/or (7) collecting one or more sample measurements to ensure quality control. Further embodiments also include the product including PMA, HMA, WMA, mastic asphalt, roofing tiles, and/or emulsion produced by any of the processes described herein.

Agglomeration is a process that involves rotating cutters like knives within a chamber to cut and shred the material. During processing, heat is generated that further agglomerate the material into flakes. By controlling the input material, processing time, and lubricating water, agglomerated plastic particles particle such as flakes, granules, or pellets are produced having an average diameter ranging from 0.1 mm to 50 mm and including any sub-range therein including, but not limited to, 0.1 mm to 1 mm, 1 mm to 5 mm, 5 mm to 10 mm, 10 mm to 15 mm, 15 mm to 20 mm, 20 mm to 25 mm, 25 mm to 30 mm, 35 to 40 mm, 40 to 45 mm, 45 to 50 mm, 0.1 mm to 10 mm, 0.1 to 30 mm, 10 mm to 20 mm, and 20 mm to 30 mm.

The agglomerated plastic particles produced by any embodiment of the present invention can be wet or dry mixed with Dow Chemical, Inc.'s ethylene-based Reactive Terpolymer ("RET"). The RET acts as a compatibilizer to prevent separation between the insolvable agglomerated plastic particles and asphaltene components within the asphalt. Other commercially available compatibilizers can be used in addition to, or in conjunction with, RET. Compatibilizers useable with the present disclosure are described in WO 2020/160423 A1 to DOW Global Technologies, Inc., which is hereby incorporated by reference in its entirety.

Various embodiments of the invention involve producing agglomerated recycled plastic particles configured for use in manufacturing PMA. For PMA production, the agglomerated recycled plastic particles can be introduced into the polymer modifying plant that produces asphalt cement, also known as "binder." More particularly, this invention relates to methods of introducing agglomerated recycled plastics particles for polymer-modified enhancement of the asphalt binder.

Various embodiments of the invention involve producing agglomerated recycled plastic particles configured for use in manufacturing HMA. The product blends with and chemically modifies the bituminous oil, or asphalt used to bind the HMA aggregate, typically stone and sand, that will eventually be installed in roadways and parking lots. The size and shape of the agglomerated particles are critical to the final product, as the mixing and production at the HMA plant can be impacted by variations in the size and quality of the flakes. This finished mix is then packed either into small bags approximately 50-pounds bags or large 2000-pound super sacks that are sold and delivered to HMA production plants for further processing. The finished mix can also be packaged and/or transported using any conventional method including by barrel and dump truck. Additionally, the plastic flakes can be separately processed from the RET with the RET being blended at the PMA production plant, and the plastic flakes being processed at the HMA production plant.

Various embodiments of the invention involve producing agglomerated recycled plastic particles configured for use in manufacturing bituminous emulsions. The product is intended to be an additional component that will be digested into a mixture of bituminous oil, water, emulsifying agents, and other additives. This bituminous emulsion may be used to rejuvenate asphalt used in roadways and parking lots in form of crack seal, slurry seal, or fog seal.

Relating to the production of HMA, WMA, and mastic asphalt the invention relates to methods of introducing agglomerated recycled plastics during the blending of HMA components (binders, sand, and stone). This allows for the repurposing of waste plastic, reducing the amount of asphalt cement, and/or improving the performance of asphalt-based roadways.

In some embodiments, the plastics used include, but are not limited to, post-industrial recycled ("PIR"), post-consumer-recycled ("PCR"), and post-residential recycled ("PRCR") waste plastic. Other sources of recycled and manufactured plastic can also be used in embodiments of the present invention.

In some embodiments, the plastics used include, but are not limited to, plastics that have a melting temperature (e.g., glass transition or liquid temperature) below liquid asphalt processing temperatures. HMA is typically processed at temperatures between 140 to 180 degrees Celsius. WMA is typically processed between 90 and 130 degrees Celsius. PMA is typically processed between 140 and 200 degrees Celsius. Mastic asphalt is typically processed between 170 and 200 degrees Celsius. Accordingly, some embodiments include processing asphalt at temperatures from 90 to 200 degrees Celsius and at every range therein in 5-degree increments (e.g., 90-95, 95-100, 100-105, 105-110, 110-115, 115-120, 120-125, 125-130, 130-135, 135-140, 140-145, 145-150, 150-155, 155-160, 160-165, 165-170, 170-175, 175-180, 180-185, 185-190, 190-195, and 195-200 degrees Celsius, inclusive. Similarly, embodiments of the present invention include plastics with a glass-transition or liquid-transition temperature from 90 to 200 degrees Celsius and at every range therein in 5-degree increments (e.g., 90-95, 95-100, 100-105, 105-110, 110-115, 115-120, 120-125, 125-130, 130-135, 135-140, 140-145, 145-150, 150-155, 155-160, 160-165, 165-170, 170-175, 175-180, 180-185, 185-190, 190-195, and 195-200 degrees Celsius, inclusive. Unless otherwise stated, every numerical range disclosed herein includes the end points of the stated range.

The plastics used in various embodiments of the present invention include, but are not limited to, thin-film, low-density polyethylene ("LDPE"), #4 plastics, HDPE (High-density polyethylene), LLDPE (Linear-low-density polyethylene), PET or PETE (Polyethylene terephthalate), PP (Polypropylene), PVC (Polyvinyl chloride), and PS (Polystyrene).

The processed agglomerated plastic particles in any embodiment of the present invention can have any suitable shape including flakes, pellets, balls, chips, ribbons, or an irregular shape and including any combination thereof. Moreover, the processed agglomerated plastic can have two or more of the shapes identified above. For example, some of the agglomerate particles can have a flake shape, some a pellet shape, and some a ribbon shape. The shape is dependent on several factors including the chemical and physical composition of the recycled plastic, the processing temperature, the amount of water present, and the cutting or shredding apparatus used. Shapes with a higher surface area to mass ratio such as flakes may be used since they are easier to melt and mix with subsequent components of the process.

Further embodiments of the invention relate to the production of bituminous emulsions used for asphalt pavement rejuvenation applications such as crack seal, slurry seal, and fog seal. More particularly, these embodiments relate to methods of introducing agglomerated recycled plastic particles during the manufacturing of the emulsion either in dedicated or mobile manufacturing plants. This allows for repurposing of waste plastic, reducing in amount of crude oil, and improving performance in the rejuvenation of asphalt roadways.

One of skill in the art will understand that any feature, element, or characteristic of any embodiment of the present invention can be used or combined with any feature, element, or characteristic of any other embodiment of the present invention. Unless otherwise expressly stated, it is in no way intended that any method or embodiment set forth herein be construed as requiring that its steps or actions be performed in a specific order. Accordingly, where a method, system, or apparatus claim for example does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification.

BRIEF DESCRIPTION OF THE DRAWINGS

The accompanying drawings, which are incorporated in and constitute part of this specification, illustrate embodiments of the invention, and together with the description, explain the principles of various embodiments of the invention. The embodiments described in the drawings and specification in no way limit or define the scope of the present invention.

FIG. 1 is a diagram of a method according to some embodiments of the present invention.

FIG. 2 is a diagram of a method according to some embodiments of the present invention.

Figure 3:
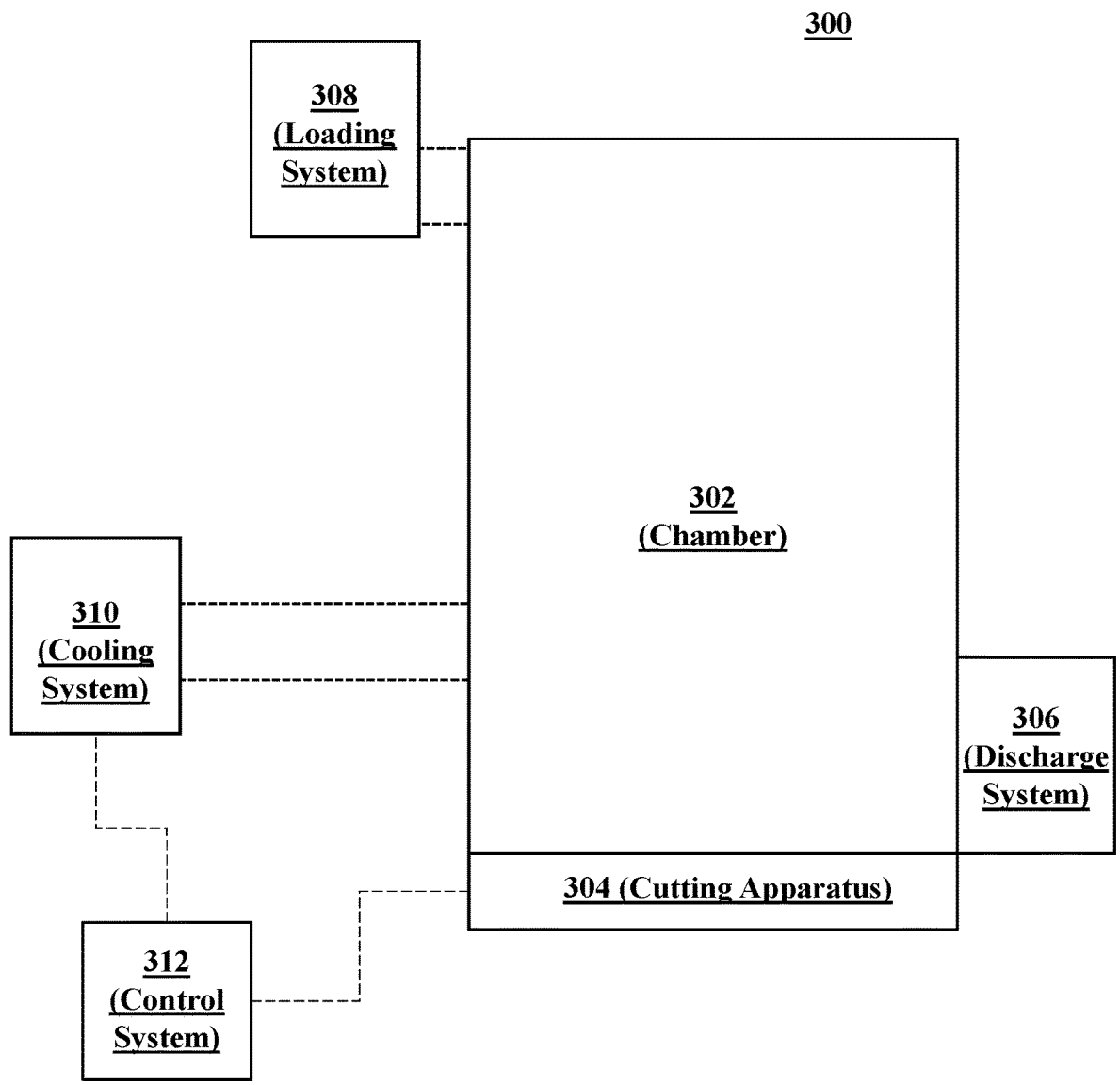
FIG. 3 is a block diagram of a system according to some embodiments of the present invention.

The embodiments of the present invention have been illustrated in all respects to be illustrative rather than restrictive. For example, a person skilled in the art will understand that the elements in the drawings are not limited to the specific dimensions shown, but are for illustrative purposes only. Those skilled in the art will further realize that the embodiments of the present invention are capable of many modifications and variations without departing from the scope of the present invention.

DETAILED DESCRIPTION OF THE INVENTION

As required, various embodiments of the present invention are disclosed herein; however, it is to be understood that the disclosed embodiments are merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Various embodiments of the present invention disclose methods and system and for producing agglomerated recycled plastic particles configured for use with various asphalt-based products and/or asphalt compatibilizers.

Methods of the Invention

Various embodiments of the present invention provide a method (100) for producing agglomerated recycled plastic particles configured for use in the production of asphalt products including, but not limited to PMA, HMA, WMA production, mastic asphalt, roofing tiles, and various emulsions. The methods disclosed herein can be performed using one or more of the systems described herein, including system (300), but are not limited to those systems.

In some embodiments as described in FIG. 1, the method (100) includes loading (101) a quantity of recycled plastic into a chamber with a cutting apparatus configured to produce agglomerated plastic particles. In some embodiments, the quantity of recycled plastic is loaded through an inlet of the chamber. The quantity of recycled plastic loaded (101) into the chamber may be from 1 to 1000 pounds and in any multiple of ten-pound increments thereof. By way of example, in some embodiments the quantity of recycled plastic may be from 10 to 50 pounds, 10 to 100 pounds, or 10 to 250 pounds. The recycled plastic may be any suitable recycled plastic, such as post-industrial recycled plastic, post-residential recycled plastic, or post-consumer recycled plastic. The recycled plastic may be any suitable waste plastic that has a glass-transition or liquid-transition temperature below 200 degrees Celsius. In some embodiments, the recycled plastic may have a glass transition temperature in the range of 90-95, 95-100, 100-105, 105-110, 110-115, 115-120, 120-125, 125-130, 130-135, 135-140, 140-145, 145-150, 150-155, 155-160, 160-165, 165-170, 170-175, 175-180, 180-185, 185-190, 190-195, and 195-200 degrees Celsius. In some embodiments, the recycled plastic may have a glass transition temperature in the range of 140-200 degrees Celsius, inclusive. The recycled plastic may be any suitable waste plastic that has a liquid-transition temperature below 200 degrees Celsius. In some embodiments, the recycled plastic may have a liquid-transition temperature in the range of 90-95, 95-100, 100-105, 105-110, 110-115, 115-120, 120-125, 125-130, 130-135, 135-140, 140-145, 145-150, 150-155, 155-160, 160-165, 165-170, 170-175, 175-180, 180-185, 185-190, 190-195, and 195-200 degrees Celsius. In some embodiments, the recycled plastic may have a liquid-transition temperature in the range of 140-200 degrees Celsius. The recycled plastic may be any suitable plastic, such as a thin-film, low-density polyethylene, #4 plastic, high-density polyethylene (HDPE), linear low-density polyethylene (LLDPE), polyethylene terephthalate (PET), polyethylene terephthalate glycol (PETG), polypropylene (PP), polyvinyl chloride (PVC), or polystyrene (PS).

The agglomerated plastic particles produced by the systems and methods of the present invention may be in any suitable shape adapted for use in the production of asphalt products such as flakes, pellets, powders, or granules. In some embodiments, the agglomerated plastic particles may be flakes with an average diameter from 0.1 to 50 mm. The flakes may be any suitable shape, such as circular, oval, or irregular. In some embodiments, the agglomerated recycled plastic particles may be in the form of pellets with an average diameter from 0.1 to 50 mm. In some embodiments, the agglomerated recycled plastic particles may be in the form of granules with an average diameter from 0.1 to 50 mm.

The recycled plastic may be pre-wetted with water prior to loading into the chamber. Pre-wetting the recycled plastic may reduce the amount of water that is needed to be added to the chamber during the agglomeration process. In some embodiments, the recycled plastic may be pre-wetted with an amount of water from 25 to 2000 ml and in any multiple of 5 ml increments thereof.

In some embodiments, the cutting apparatus may be run (104) for a first interval to produce an intermediate agglomerate. The cutting apparatus, if it comprises rotating cutters, may be run at any suitable rotational speed. The cutting apparatus may be run at a speed or rotational speed to produce agglomerated plastic particles configured for use with asphalt products as disclosed herein. The cutting apparatus may be run (104) for any suitable interval, such as from one to ten minutes and including in any multiple of 10 second increments thereof. By way of example, in some embodiments, the cutting apparatus may be run (104) for from two to five minutes.

In some embodiments, during the first interval, the chamber is maintained (106) at a first temperature during the first interval. The chamber temperature may be maintained (106) using one or more of the cooling systems described herein. The chamber may be cooled using any suitable cooling method. In some embodiments, the chamber may be cooled by circulating cool water through the water lines. In some embodiments, the chamber may be cooled by circulating cool air through the air lines. The chamber temperature is, in some embodiments, determined by the air temperature inside the chamber. In some embodiments, the chamber temperature is determined by a water and/or coolant temperature associated with one or more cooling system. In some embodiments, the chamber temperature may be any suitable temperature. For example, in some embodiments, the chamber temperature may be maintained (106) at less than 100 degrees Celsius during the first interval. In some embodiments, the chamber temperature may be maintained (106) at less than 50 degrees Celsius during the first interval. In some embodiments, the chamber temperature may be maintained (106) at less than 20 degrees Celsius during the first interval.

In some embodiments, after the first interval, a first amount of water is added (108) to the chamber. The first amount of water may be any suitable amount, such as from 25 to 2000 ml. In some embodiments, the first amount of water may be from 50 to 1000 ml. The first amount of water may be added (108) to the chamber using any suitable method, such as pouring, spraying, or injecting.

Once the first amount of water is added (108), the cutting apparatus may be run (110) for a second interval with the intermediate agglomerate to produce a plurality of agglomerated plastic particles adapted for use in asphalt production. In some embodiments, the second interval is from one to 120 seconds, inclusive. In some embodiments, the second interval is from two to 60 seconds, inclusive. In some embodiments, the second interval is from three to 30 seconds.

In further embodiments, after the second interval, the agglomerated recycled plastic particles are discharged from the chamber, such as via an outlet. The agglomerated recycled plastic particles may be discharged from the chamber using any suitable method, such as pouring, dumping, or conveying.

A further embodiment of the method for producing an agglomerated recycled plastic for use in asphalt products is shown in FIG. 2. First, a quantity of recycled plastic is loaded (202) into a chamber with a cutting apparatus configured to produce agglomerated plastic particles. Second, the cutting apparatus is run (204) for a first interval comprising one to ten minutes to produce an intermediate agglomerate. Third, a chamber air temperature is maintained (206) of less than 100 degrees Celsius during the first interval. Fourth, a first amount of water is added (208) comprising 25 to 2000 ml to the chamber after the first interval. Fifth, the cutting apparatus is run (210) for a second interval comprising one to 600 seconds with the intermediate agglomerate to produce a plurality of agglomerated plastic particles adapted for use in asphalt production, wherein the plurality of agglomerated plastic particles comprise flakes with an average diameter from 0.1 mm to 50 mm. Finally, the plurality of agglomerated plastic particles is discharged (212) from the chamber after the second interval.

In some embodiments, the method can further include mixing the agglomerated recycled plastic particles with an asphalt compatibilizer. The asphalt compatibilizer may be any suitable material, such as an ethylene-based reactive terpolymer, that is compatible with asphalt. The asphalt compatibilizer may be mixed with the agglomerated recycled plastic particles using any suitable method, such as mixing, blending, or kneading.

In some embodiments, the asphalt compatibilizer may be mixed with an asphalt binder to form a binder mixture. The asphalt binder may be any suitable binder, such as a HMA binder. The asphalt binder may be any suitable material, such as bitumen, that is used to bind together the HMA components. The asphalt binder may be mixed with the asphalt compatibilizer using any suitable method, such as mixing, blending, or kneading. In some embodiments, the binder mixture may be mixed with the agglomerated recycled plastic particles. In some embodiments, the asphalt compatibilizer may be mixed with the asphalt binder prior to mixing the binder mixture with the agglomerated recycled plastic.

In some embodiments, the asphalt compatibilizer may be mixed with one or more HMA components to form a component mixture. The HMA component may be any suitable component, such as aggregate, that is used in HMA. HMA component may be mixed with the asphalt compatibilizer using any suitable method, such as mixing, blending, or kneading. In some embodiments, the component mixture may be mixed with the agglomerated recycled plastic particles. In some embodiments, the asphalt compatibilizer may be mixed with the HMA component prior to mixing the component mixture with the agglomerated recycled plastic particles.

In some embodiments, one or more samples are collected. A sample of the recycled plastic may be collected before loading the recycled plastic into the chamber. A sample of the recycled plastic may be collected after the cutting apparatus is run for the first interval. A sample of the recycled plastic may be collected after the cutting apparatus is run for the second interval. A sample of the recycled plastic may be collected after the agglomerated recycled plastic is discharged from the chamber. A sample of the agglomerated recycled plastic particles may be collected before mixing the agglomerated recycled plastic particles with the asphalt compatibilizer. A sample of the agglomerated recycled plastic particles may be collected before mixing the agglomerated recycled plastic with the asphalt binder. A sample of the agglomerated recycled plastic particles may be collected before mixing the agglomerated recycled plastic with a PMA, HMA, WMA, mastic asphalt, roofing tiles, or emulsion component. The samples of the recycled plastic may be collected using any suitable method, such as sampling, scooping, or dipping. The samples of the recycled plastic may be analyzed for size, shape, temperature, or chemical composition using any suitable method, such as microscopy, spectroscopy, or chromatography.

Systems of the Invention

Various embodiments of the present invention provide a system for producing agglomerated plastic particles from recycled plastics. FIG. 3 provides a block diagram of a system (300) of one such embodiment. The chamber (302) can include an inlet and an outlet. In some embodiments, the chamber (302) may be formed of any suitable material, such as metal, plastic, or composite materials. For example, in some embodiments, the chamber (302) may be formed of stainless steel. In some embodiments, a cutting apparatus (304) configured to produced agglomerated plastic particles for use with asphalt products is disposed in the chamber (302) and is operable to cut or chop recycled plastics as described herein. In some embodiments, the cutting apparatus (304) may comprise one or more rotatable metal blades, while in some embodiments the cutting apparatus (304) may be any suitable cutting device such as a shredder, a grinder, or a chopper.

In some embodiments, the chamber (302) is configured to receive recycled plastic. In some embodiments, the recycled plastic is in the form of shredded recycled plastic. In some embodiments, the recycled plastic comprises at least one of a post-industrial recycled and post-residential recycled waste plastics as described herein.

In some embodiments, the system (300) includes a loading system (308). In some embodiments, the loading system (308) is a recycled plastic loading system. The recycled plastic loading system (308) is operably coupled to the chamber (302) and configured to load a quantity of recycled plastic into the chamber (302). In some embodiments, the system includes an asphalt compatibilizer loading system operably coupled to the chamber (302) and configured to load an asphalt compatibilizer into the chamber (302). The system may further comprise a binder mixture loading system operably coupled to the chamber (302) and configured to load a binder mixture into the chamber (302). The system (300) may further comprise a component mixture loading system operably coupled to the chamber (302) and configured to load a component mixture into the chamber (302). In some embodiments, a single loading system (308) operates as a loading system for all of plastic, asphalt compatibilizer, binder mixture, component mixture, and the like.

In some embodiments, the system includes a mixing apparatus. In some embodiments, the mixing apparatus is operably connected to and/or contained within the chamber (302), while in some embodiments the mixing apparatus is standalone or a part of a manufacturing line of the system (300). In some embodiments, the mixing apparatus may be configured to mix the agglomerated recycled plastic particles with an asphalt binder or with one or more components used for bituminous emulsions. The first mixing apparatus may be configured to mix the agglomerated recycled plastic particles with the asphalt binder. The system (300) may further comprise a second mixing apparatus operably coupled to the chamber (302). Then in some embodiments, the first and/or section mixing apparatus may be configured to mix the agglomerated recycled plastic particles with an asphalt compatibilizer prior to mixing the agglomerated recycled plastic particles with an asphalt binder.

In some embodiments, the system (300) further includes a cooling system (310) operably coupled to the chamber (302). In some embodiments, the cooling system (310) may be any suitable cooling system, such as a water-cooling system, an air-cooling system, a heat-exchange system, a combination of one or more thereof, or the like. The water-cooling system may include one or more water lines or circuits operably coupled to the chamber (302). The system (300) may include a water reservoir operably coupled to the chamber (302) and operably coupled to the water lines or circuits. In some embodiments, the reservoir is operably coupled to a cooling pump operably coupled to the chamber (302). The air-cooling system may include one or more air lines operably coupled to the chamber (302). The cooling system (310) is operable to cool and/or otherwise maintain one or more temperature of the chamber (302) for one or more intervals of time.

In some embodiments, the system (300) may further comprise a control system (312) operably coupled to one or more of the cutting apparatus (304), the water-cooling system (310), the recycled plastic loading system (308), the discharge system (306), the asphalt compatibilizer loading system (308), and the like.

The control system (312) can comprise one or more analog or digital components or circuits. By way of one example, the control system (312) can comprise a user interface, a processor, sensor inputs for sensing one or more of cutting apparatus (304) revolutions per minute, system amperage, weight or mass of plastic in the chamber, air temperature, water temperature, water amount, water vapor, and cutting apparatus run time (304), and/or a device controller for communicating with and controlling one or more system (300) components including the loading system (308), chamber (302), cutting apparatus (304), cooling system (310), water injection system, water reservoir, cooling pump, and/or air lines. The processor further communicates with the device controller with translates between digital signals used by the processor and digital and/or analog signals accepted by the system (300) components.

The user interface allows an operator to control various system parameters such as cutting apparatus (304) revolutions per minute and/or run time, the amount of water adding prior to or during the agglomeration process, and operation of the cooling system (310). The user interface also allows an operator to read the output from one or more sensors, control one or more system (300) components, and/or select from one or more pre-defined programs to operate the system (300) from loading through discharge. The user interface can comprise a simple menu system with buttons to an interactive touch screen display.

The control system (312) may be configured to: load a quantity of recycled plastic into the chamber (302); run the cutting apparatus (304) for a first interval; maintain a chamber (302) air temperature during the first interval; add an amount of water to the chamber (302) after the first interval; run the cutting apparatus (304) for a second interval to produce agglomerated plastic particles; discharge the agglomerated recycled plastic particles from the chamber (302) after the second interval; and/or mix the agglomerated recycled plastic particles with an asphalt compatibilizer.

In some embodiments, the control system (312) may be configured to maintain the chamber (302) air temperature during the first interval and/or the second interval using the cooling system (310). In some embodiments, the control system (312) may be configured to maintain water in the water-cooling system (310) below 40 degrees Fahrenheit during the first interval and/or the second interval. In some embodiments, the control system (312) may be configured to maintain the chamber (302) air temperature from 0 to 100 degrees Celsius, and including any multiple of five-degree increments, during the first interval and/or the second interval. By way of example, the control system (312) may be configured to maintain the chamber (302) air temperature from 30 to 70 degrees Celsius during the first interval and/or the second interval. The control system (312) may be configured to load a quantity of recycled plastic from 10 to 1000 pounds into the chamber (302).

The control system (312) may be configured to run the cutting apparatus (304) for the first interval comprising one to ten minutes. The control system (312) may be configured to run the cutting apparatus (304) for the second interval comprising one to 600 seconds. The control system (312) may be configured to add an amount of water comprising from 50 to 2000 ml into to the chamber (302). During the second interval, the cutting apparatus (304) produces a plurality of agglomerated plastic particles as described herein.

In some embodiments, the control system (312) controls the order of operations and timing of mixtures. In some embodiments, the control system (312) is configured to mix the agglomerated recycled plastic particles with an asphalt compatibilizer prior to mixing the agglomerated recycled plastic particles with an asphalt binder or with one or more hot mix asphalt components. The control system (312) may be configured to mix the asphalt compatibilizer with the asphalt binder to form the binder mixture. The control system (312) may be configured to mix the asphalt compatibilizer with the asphalt binder prior to mixing the agglomerated recycled plastic particles with the binder mixture. The control system (312) may be configured to mix the asphalt compatibilizer with the one or more hot mix asphalt components to form the component mixture. The control system (312) may be configured to mix the asphalt compatibilizer with the one or more hot mix asphalt components prior to mixing the agglomerated recycled plastic particles with the component mixture.

One of skill in the art will understand that the features of the novel system and method disclosed herein may be used together to create further embodiments of the disclosed invention. While the invention has been described in detail in connection with specific embodiments, it should be understood that the invention is not limited to the above-disclosed embodiments. Rather, a person skilled in the art will understand that the invention can be modified to incorporate any number of variations, alternations, substitutions, or equivalent arrangements not heretofore described, but which are commensurate with the spirit and scope of the invention. Specific embodiments should be taken as exemplary and not limiting and references to the "invention" or to the "disclosed invention" do not limit or define the scope of any embodiment.

What is claimed is:

1. A method for producing an agglomerated recycled plastic for use in asphalt products, the method comprising:
    loading a quantity of recycled plastic into a chamber with a cutting apparatus configured to produce agglomerated plastic particles;
    running the cutting apparatus for a first interval to produce an intermediate agglomerate;

maintaining a chamber air temperature during the first interval of less than 100 degrees Celsius;

adding a first amount of water to the chamber after the first interval; and running the cutting apparatus for a second interval with the intermediate agglomerate to produce a plurality of agglomerated plastic particles adapted for use in asphalt production.

2. The method of claim 1, wherein the chamber is coupled to a cooling system, the cooling system selected from the group consisting of a water-cooling system, an air-cooling system, and a heat-exchange system.

3. The method of claim 2, wherein water in the water-cooling system is maintained below 100 degrees Celsius during the first interval and/or the second interval.

4. The method of claim 1, wherein the agglomerated plastic particles comprise a plurality of flakes with an average diameter from 0.1 mm to 30 mm, inclusive.

5. The method of claim 1, further comprising mixing the agglomerated plastic particles with an asphalt compatibilizer.

6. The method of claim 5, further comprising mixing the agglomerated plastic particles with an asphalt binder after mixing the agglomerated plastic particles with the asphalt compatibilizer.

7. The method of claim 5, further comprising mixing the agglomerated plastic particles with one or more hot mix asphalt components after mixing the agglomerated plastic particles with the asphalt compatibilizer.

8. The method of claim 1, further comprising mixing an asphalt compatibilizer with an asphalt binder to form a binder mixture.

9. The method of claim 8, further comprising mixing the agglomerated plastic particles with the binder mixture.

10. The method of claim 1, further comprising mixing an asphalt compatibilizer with one or more hot mix asphalt components to form a component mixture.

11. The method of claim 10, further comprising mixing the agglomerated plastic particles with the component mixture.

12. The method of claim 1, wherein the chamber air temperature is maintained at less than 100 degrees Celsius during the first interval and the second interval.

13. The method of claim 1, wherein the quantity of recycled plastic is from 1 to 1000 pounds, inclusive.

14. The method of claim 1, wherein the first interval is from one to ten minutes, inclusive.

15. The method of claim 14, wherein the second interval is from one to 600 seconds, inclusive.

16. The method of claim 1, wherein the first amount of water is from 25 to 2000 ml, inclusive.

17. The method of claim 16, further comprising adding a second amount of water to the chamber before the first interval to pre-wet the quantity of recycled plastic.

18. The method of claim 17, wherein the second amount of water is from 25 to 2000 ml, inclusive.

19. A method for producing an agglomerated recycled plastic for use in asphalt products, the method comprising:

loading a quantity of recycled plastic into a chamber with a cutting apparatus configured to produce agglomerated plastic particles, wherein the recycled plastic has an average liquid-transition temperature of less than or equal to 200 degrees Celsius;

running the cutting apparatus for a first interval from one to ten minutes inclusive to produce an intermediate agglomerate;

maintaining a chamber air temperature of less than 100 degrees Celsius during the first interval;

adding a first amount of water from 25 to 2000 ml inclusive to the chamber after the first interval;

running the cutting apparatus for a second interval from one to 120 seconds inclusive with the intermediate agglomerate to produce a plurality of agglomerated plastic particles adapted for use in asphalt production, wherein the plurality of agglomerated plastic particles comprise flakes with an average diameter from 0.1 mm to 50 mm, inclusive; and discharging the plurality of agglomerated plastic particles from the chamber after the second interval.

\* \* \* \* \*